Nov. 5, 1963   H. J. AUDET ETAL   3,109,751
PROCESS AND APPARATUS FOR COATING RODS
Filed Aug. 24, 1960   4 Sheets-Sheet 1

HENRY J. AUDET
DWIGHT J. DWINELL
KENNETH JAMES
DONALD L. KINGSTON
*INVENTORS*

BY Owen J. Megan
ATTORNEY

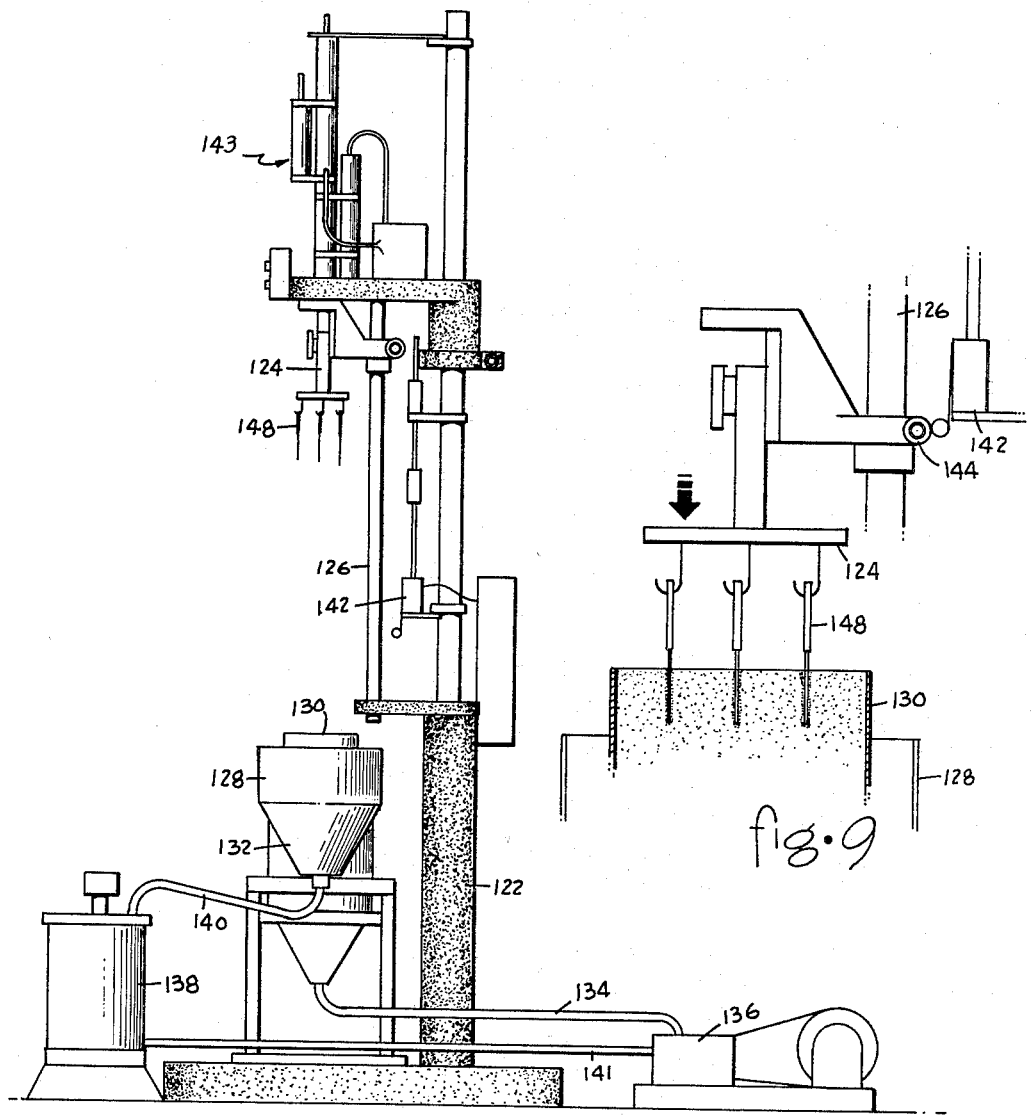

3,109,751
PROCESS AND APPARATUS FOR COATING RODS

Henry J. Audet, Salem, Dwight J. Dwinell, Reading, Kenneth James, Melrose, and Donald L. Kingston, Marblehead, Mass., assignors to Sylvania Electric Products Inc., a corporation of Delaware
Filed Aug. 24, 1960, Ser. No. 51,668
9 Claims. (Cl. 117—113)

This invention relates to a process and apparatus for the coating of a glass frit to a solid base member. More particularly, this invention relates to a process and apparatus that uniformly coats metal rods or pointers by dipping the rods or pointers into a thixotropic suspension of glass frit.

In the past, the coating of metal rods and pointers with a glass frit was done individually by hand dipping each rod into a tank containing the thixotropic suspension. This operation was done with infinite care so that each rod was coated only to the desired depth and thickness. The method had many drawbacks since it is quite difficult to maintain uniform dipping depth and a uniform motion necessary for an even coat.

An object of this invention is to provide for a process and apparatus for uniformly coating a metal rod or pointer with a glass frit to a desired depth at a constant motion whereby it is coated to a uniform length and thickness.

Another object of this invention is to provide a process and apparatus whereby ganged articles can be dipped, thus increasing speed of production.

A feature of this invention is that the rods may be dipped into the thixotropic suspension at a uniform velocity, thus providing, if desired, a coat of even thickness throughout the entire length of the rods. This uniformity of coating was quite difficult to achieve when using the hand dip method of the prior art.

Other objects, features and advantages will be apparent from the following specification taken in connection with the accompanying drawings.

FIGURE 8 is a side elevational view of a modification of the dipping apparatus showing in particular the arrangement of the main components.

FIGURE 9 is a detail of the holding device of FIGURE 8 in its full stroke position.

Figure 1:
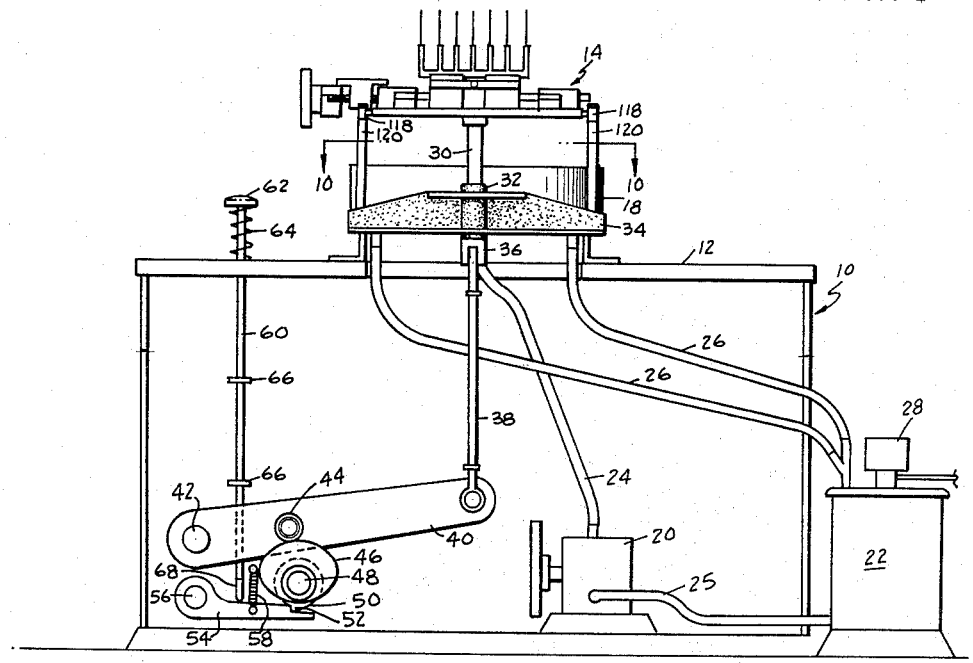
FIGURE 1 is a front elevational view of the dipping apparatus showing in particular the main components of the equipment.
Figure 2:
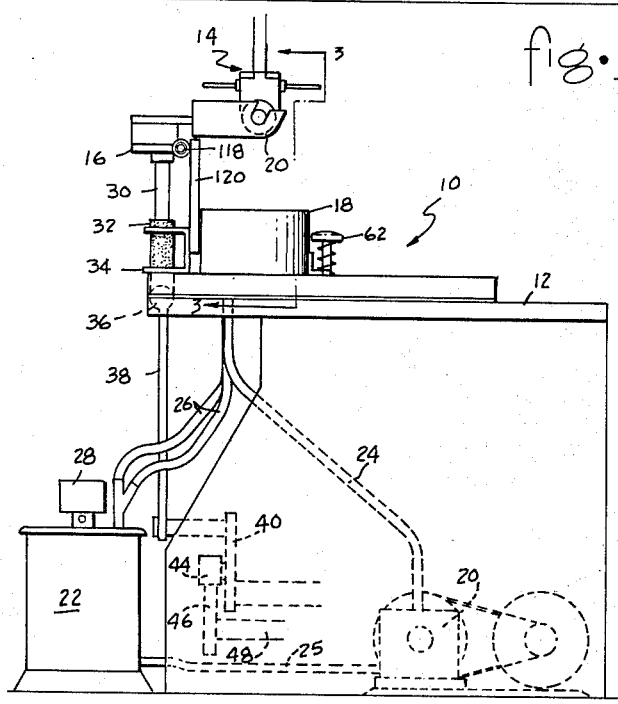
FIGURE 2 is an elevational view of the right side of the apparatus.
Figure 10:
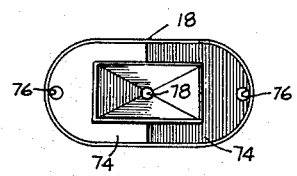
FIGURE 10 is a detailed plan view of the weir tank and the collector tank taken on the line 10—10 of FIGURE 1.
Figure 3:
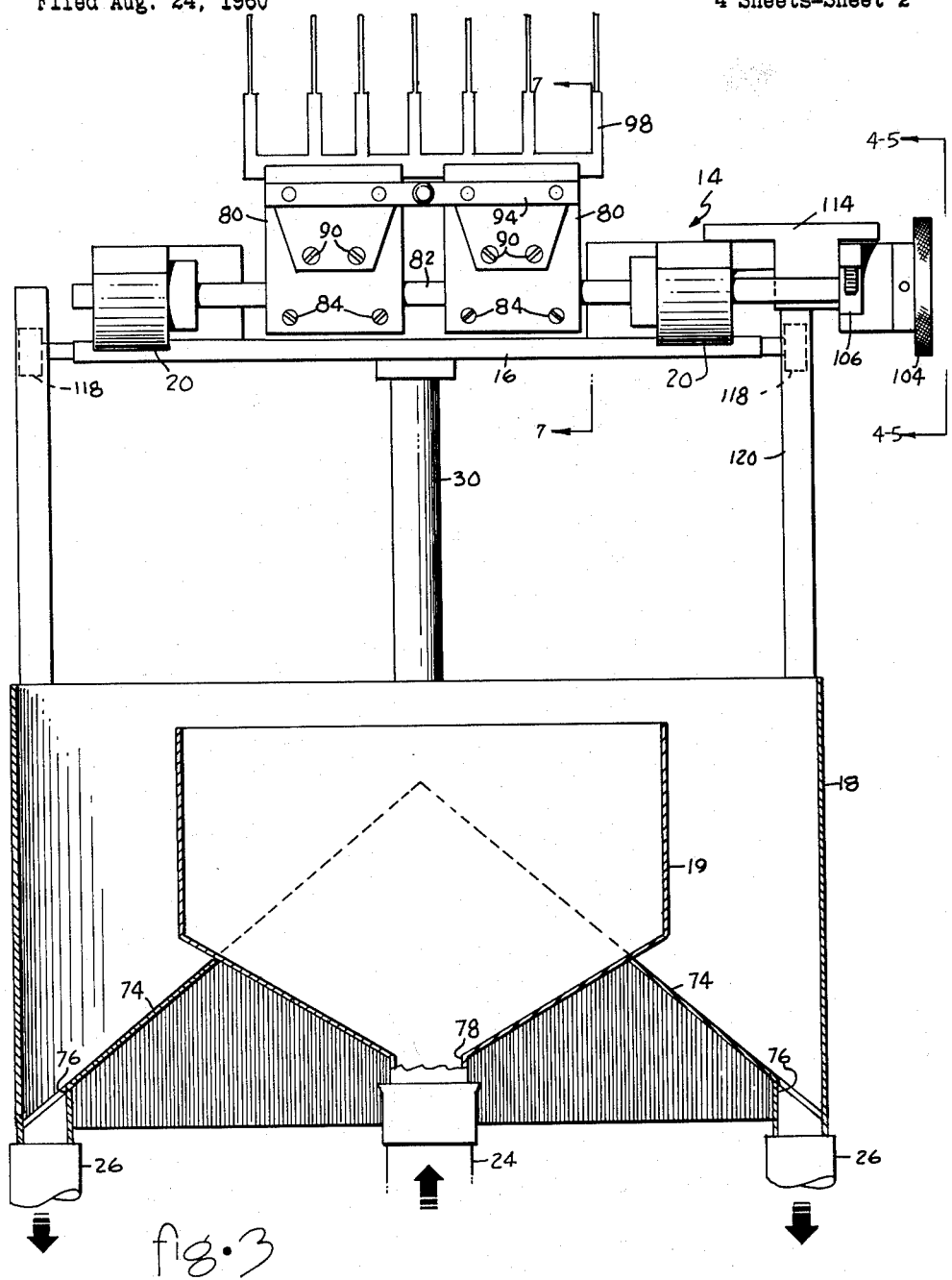
FIGURE 3 is a detail view of the trough and jig arrangement taken on the lines 3—3 of FIGURE 2.

Referring to FIGURES 1, 2 and 3, the coating apparatus is generally indicated at 10 and comprises a table or stand 12 and a rotatable holding fixture 14 that is supported on a main support bar 16 supported from table 12. The holding fixture 14 is centrally located above a pair of tanks, an elliptical shaped outer collector tank 18 and a square shaped inner weir tank 19 (see FIG. 10). The tanks 18 and 19 are fixed to the surface of table 12. Positioned below the table 12 is a pump 20 which is connected to the inner weir tank 19 by inlet pipe 24. The inlet side of pump 20 is connected to a storage reservoir 22 by pipe 25. The reservoir 22 holds a supply of thixotropic dipping mixture and is in turn connected to the outer collector tank 18 by pipes 26. An agitator 28 is affixed to the top of reservoir 22.

With the above-described arrangement a thixotropic suspension is pumped from the storage reservoir 22 to the the inner weir tank 19 through the pipes 25 and 24 and returned to the reservoir 22 by the outlet pipes 26 located on each side of the bottom of the collector tank 18. The agitator 28 mounted on the top of the storage reservoir 22 has stirring blades (not shown) positioned within the reservoir. The purpose of the blades is to agitate the thixotropic suspension to keep it in constant motion thus preventing settling.

As mentioned above, the holding fixture 14 which is supported above the tanks 18 and 19 is rotatably positioned in a pair of yoke arms 20 fixed to the top of a cross-support bar 16. The support bar 16 is fixed to the top part of a vertical guide rod 30, which is slidably mounted in a bearing guide 32 of a bracket 34, which is secured to the upper portion of table 12. The guide rod 30 extends downwardly through the bracket 34 and is provided at its lower end with a connecting yoke 36. The yoke 36 pivotally holds the top end of a connecting rod 38, which in turn is pivotally connected to an actuator arm 40.

Referring to FIGURE 1, the actuator arm 40 is pivotally mounted on a shaft 42. The other end of the actuator arm is connected to the connecting rod 38. Positioned midway the length of the actuator arm 40 is a roller 44 which is in constant engagement with the periphery of a cam 46, said cam being located on a rotating shaft 48. A single cycle revolution clutch 50 positioned on shaft 48 and to the rear of cam 46 controls the rotation. The clutch 50 in its home position has a single node 52 in engagement with a clutch dog 54 which is pivotally mounted on a stub shaft 56 and is spring braced into engagement with the clutch node 52 by a spring 58. With this arrangement, the shaft 48 is rotated by drive means (not shown) but the cam 46 and clutch 50 are held from rotating with the shaft 48 by the engagement of the clutch dog 54 with the clutch 50. In some cases, cam 46 may have a raised portion so that the article of work may be coated to a thicker or thinner degree as desired. Surprisingly, if the work is withdrawn very rapidly for a short time, the coat will be thicker; if it is withdrawn slowly the coat will be thinner.

A spring braced plunger rod 60 projects above the surface of the table 12 and is provided with an enlarged head 62, and positioned between the head and the surface of the table is a spring 64 encompassing the plunger rod 60 and bracing it to a limited raised position. The plunger rod 60 extends below the table surface and is guided by suitable guide brackets 66. The bottom portion of the plunger terminates in a nose portion 68 that rests on the top surface of the clutch dog 54.

Thus, by depression of the plunger 60, the nose portion 68 will disengage the clutch dog 54, thereby allowing the clutch 50 to rotate the shaft 48 and the cam 46. The shape of the cam 46 is such that the actuator arm 40 and its associated connector rod 38 will allow guide rod 30 and the cross support bar 16 holding the holding fixture 14 to fall downwardly to a predetermined lowered position then raise it again to the position shown.

The tank 19, located below the holding fixture 14, is supplied a thixotropic suspension through inlet pipe 24.

As viewed in FIGURE 3, the tank 18 encompasses the smaller weir tank 19 which is positioned equidistantly from the sides of tank 18 by slanted inner walls 74. The walls 74 are joined at the bottom of the sides of tank 18 and at this point two orifices 76 are formed; the outlet pipes 26 are attached thereto. The weir tank 19 also has a sloping bottom surface that converges to a lower central orifice 78. This orifice 78 constitutes the inlet source for the thixotropic suspension through inlet pipe 24. By means of this central inlet, internal circulation is caused in the weir tank and no dead spots will appear which would tend to destroy the thixotropicity of the suspension. The weir tank 19 is filled with a thixotropic suspension to an overflowing condition and the excess of the suspension flows over the sides of the weir tank 19 and down the slanted inner walls 74 to the outlets 76. The thixotropic suspension as viewed in FIGURE 1 is returned to the storage reservoir 22 to be recycled by pump 20.

The holding fixture 14, as seen in detail in FIGURES 3, 4, 5 and 6 comprises a pair of identical clamping fixtures 80 fixed to a longitudinal extending shaft 82 by suitable screws 84. The clamping fixtures 80 as seen in FIGURE 7, are solid members. The shaft 82 extends through the bottom half of the fixture and the fixture 80 is securely held to the shaft 80 by the clamping of screws 84. The top surface of the fixture 80 has a reduced portion to provide a central backing extension 86 (shown in FIGURE 7). A pair of leaf-spring arms 88 are secured to the fixture's front and back sides by screws 90 as seen in FIGURE 3. The upper part of the leaf-springs are free and are provided with contact nodes 92 fixed to the extreme upper ends. The nodes 92 are spring-urged by the leaf-spring arms 88 against the backing extension 86. A common bar 94 is secured to each pair of leaf-spring arms 88 below their distal ends and a pin-handle 96 is secured midway the length of each bar 94. The purpose of the pin-handle 96 can be clearly seen in FIGURE 7 where a work piece 98 is fitted between the backing extension 86 and the leaf-spring nodes 92, the leaf-spring arms 88 providing a means to securely hold suitable work pieces 98 in place. As seen in FIGURE 7, the leaf-spring arms 88 are moved out of engagement with the backing extension 86 by the depression of the pin-handle 96 as seen by phantom lines. For example, a pair of ganged pieces of work 98 (see FIGS. 3 and 4) are inserted in the holding fixture 80 and held rigidly in an upright position.

Figure 4:
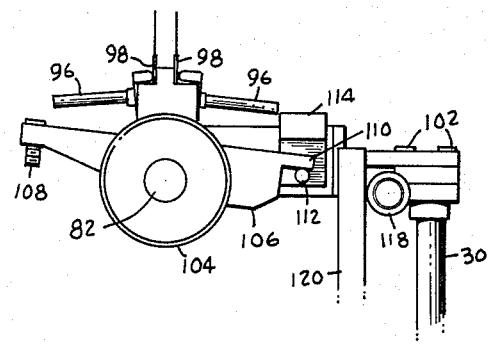
FIGURE 4 is a detail of the holding fixture arrangement taken on the line 4—4 of FIGURE 3 showing in particular the loading position of the fixture.
Figure 5:
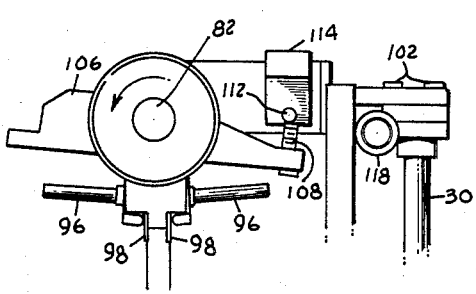
FIGURE 5 is a detail view of the holding fixture arrangement taken on the line 5—5 of FIGURE 3 showing in particular the fully rotated position of the holding fixture prior to the dipping operation.

Referring to FIGURE 3, the shaft 82 is held by spaced-apart bearing yokes 20 which are secured to the support bar 16 by suitable fastening means such as screws 102 (see FIGS. 4 and 5). The right-hand end of shaft 82, as viewed in FIGS. 3 and 4, extends through the right-hand bearing yoke 20. An enlarged knurled knob 104 is fixed to the end of the shaft 82. Adjacent the knob 104 is an adjustable stop arm 106 (see FIG. 4) which is pivotally mounted midway its length on shaft 82. The left-hand extension of arm 106 (as seen in FIG. 4) has a reduced portion which holds a set screw 108 and the right-hand end is provided with an abutment 110 resting on a pin 112 which is secured to the right-hand bearing yoke 20. Also positioned on the pin 112 is a slidable T-shaped stop member 114 adapted to be slid along the length of pin 112. When the stop member 114 is moved to the right, as viewed in FIG. 3, the right-hand ledge 116 of the T-shaped stop member 114, overlies the abutment 110 of the stop arm 106 thereby holding the adjustable stop arm 106 in a fixed position. When the T-shaped stop member 114 is moved to the left, the adjustable stop arm 106 is free and may be rotated by the knob 104 to a position as shown in FIGURE 5, where the set screw 108 abuts the pin 112. In this position the work holder 14 is set at a 180° displacement position thereby positioning the work pieces 98 in an inverted position.

Figure 6:
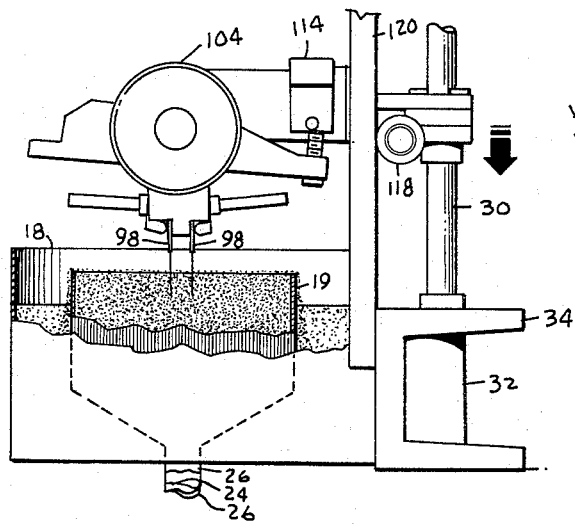
FIGURE 6 is a detail of the holding fixture arrangement at its full dipping stroke.
Figure 7:
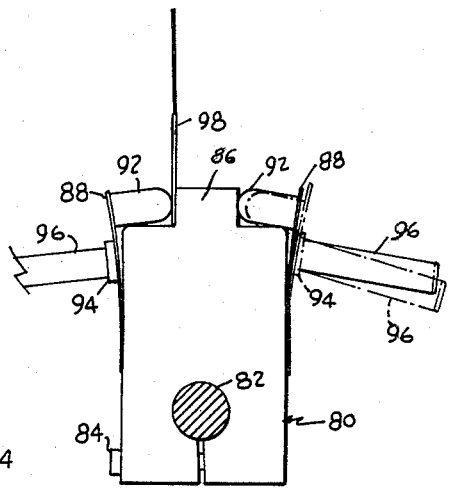
FIGURE 7 is a detail of the holding fixture taken on the lines 7—7 of FIGURE 3 showing the spring holding means that secure the work in the fixture.

The holding fixture 14 positioned as in FIGURE 5, will be moved downwardly to a position as shown in FIGURE 6, where the work pieces 98 are dipped into the thixotropic suspension to a predetermined depth. Referring to FIGURES 1, 3 and 6 as stated above, the holding fixture apparatus 14 is positioned by bracket 16 on the top part of the guide rod 30. The guide rod 30 is positioned midway between the ends of bracket 16. The two end portions of bracket 16 are provided with guide rollers 118 that ride the vertical surface of cooperating square guide posts 120. As seen in FIGURE 6, the square guide posts 120 are fixed to the rear side of the bracket 34 providing a vertical guide track for rollers 118.

To begin the dipping process, the work pieces 98 are first fitted into position on the holding fixture 14 as mentioned above in FIGURE 7. The T-stop member 114 is moved out of engagement with abutment 110 allowing the clamping fixture 80 and parts fixed to shaft 82 to be rotated by the knob 104 to a position of that shown in FIGURE 5 where the work pieces 98 are in their inverted position. The work pieces are mounted in the support bracket 14 which is then rotated 180° so that they may be readily dipped in the thixotropic mixture. The nature of the thixotropic mixture suitable for use in this invention, the method of preparation thereof and problems attendant thereto are described in the copending application of Richard de la Chapelle et al. entitled "Process," Serial No. 35,704, filed June 13, 1960. Although the system described therein is for a process of flow coating, similar thixotropic mixtures are useful in this invention.

The dipping is accomplished by depressing the plunger 60 thereby releasing clutch dog 54 and allowing the cam 46 and shaft 48 to rotate. The rotation of cam 46 moves roller 44, actuator 40, connecting rod 38 and guide rod 30 thus allowing the holding fixture 114 having the work pieces 98 fixed thereto to descend to a position of that of FIGURE 6 where the ganged work pieces 98 are immersed into the thixotropic suspension for a predetermined time depending on the low point of cam 46. Thereafter, the holding fixture 114 with the work pieces 98 in place will be returned back to the position shown in FIGURE 5 where they are removed.

Through the uniform motion of the cam 46 in lowering the work support 14, the work pieces 98 are lowered and raised at a constant velocity to provide a coating of even thickness throughout the entire length of the rods. It is quite important that the velocity be uniform since an erratic motion will cause an unevenness of the coat to the finished product. It is to be noted, however, that in some cases a thicker coat will be desired on some portions of the pointer, such as the portion to which the electrical lead will be attached. In this case the cam 46 will be designed so as to speed up the motion of the work in the suspension at the position in which the increased thickness is desired.

Before the downward movement of the holding fixture 14 and work pieces 98 from the upper position to the lower dipped position, the pump 20 supplying the thixotropic suspension to the weir tank 19 is shut off allowing the suspension to seek the upper level of the weir of tank 19. At this time a squeegee is drawn over the top surface of the weir tank 19 to remove a crown or convex miniscus formed by the suspension, thereby eliminating any irregularities in the depth of the dip.

In FIGURES 8 and 9 is shown an alternate method of accomplishing the dipping process. The apparatus is substantially similar in function but differs in driving means and the means for mounting the work. As shown in FIGURE 8, this apparatus comprises a stand 122 supporting a work holder 124 slidably mounted on a shaft 126. The work holder 124 is provided with a series of hooks for holding a group of ganged work pieces 148 to be dipped in the thixotropic suspension. Located below the work holder 124 is a tank arrangement 128 comprising a raised inner weir tank 130 and an outer overflow tank 132. The weir tank 130 is supplied with a thixotropic suspension over pipe 134 from a pump 136 and the suspension is returned to a storage reservoir 138 over pipe 140 where it is drawn back through pipe 141 to the pump 136 to recycle the suspension.

The drive to move the work holder 124 from its upper limited position to a dipped position as that shown in FIGURE 9 is accomplished by an air driven bellows system 143 located on an auxiliary stand located above the work holder 124.

A switch 142 is fixed at a predetermined position adjacent the path of travel of work holder 124. As seen in FIGURE 9, when the work holder 124 reaches the extreme dipping position, a roller 144 fixed to the work holder 124 contacts switch 142 electrically connected to the bellows and initiates a reverse motion in the bellows drive, thereby carrying the work holder 124 back to its original position of that shown in FIGURE 8.

The thixotropic dipping mixture used in this system may be similar to that used in the cam operated system. This dipping system has the advantage that very long pieces of work may be dipped in the mixture and uniformly coated.

Various modifications can be made by persons skilled in the art without departing from the spirit and scope of the invention.

We claim:

1. Apparatus for dipping rods into a thixotropic mixture of glass frit comprising: a weir tank having a sloping bottom converging to a point for retaining said dipping mixture, an overflow return tank surrounding said weir tank but spaced therefrom, an inlet for said thixotropic mixture in the lowermost central portion of said weir tank, means to pump said thixotropic mixture to said weir tank, outlet means at the bottom of said overflow return tank, recycle means connecting said outlets to said pump means to circulate the said thixotropic mixture, dipping support means for the said rods positioned over said weir tank, means to lower said support means whereby said rods will be submerged to a predetermined depth in the mixture contained in said weir tank.

2. Apparatus for dipping elongated rods into a mixture of glass frit comprising: a weir tank having a sloping bottom converging to a point for retaining said dipping mixture, an overflow return tank surrounding said weir tank but spaced therefrom, an inlet for said thixotropic mixture in the lowermost central portion of said weir tank, means to pump said thixotropic mixture to said weir tank, an outlet means at the bottom of said overflow return tank, recycle means connecting said outlet means to said means to circulate the said thixotropic mixture, a dipping support means holding said elongated rods over said weir tank, bellows means to lower said support means whereby said elongated rods will be submerged to a predetermined depth in said thixotropic mixture, and switch means to reverse said bellows means to return said support means to its raised position.

3. Apparatus for dipping rods into a thixotropic mixture of glass frit comprising: a weir tank having a sloping bottom converging to a point for retaining said dipping mixture, an overflow return tank surrounding said weir tank but spaced therefrom, an inlet in said weir tank at said converging to a point for admitting said thixotropic mixture to the lowermost portion of said weir tank, means to pump said thixotropic mixture to said weir tank, outlet means at the bottom of said overflow return tank, recycle means connecting said outlet means to said pump means to circulate the thixotropic mixture, a dipping support means for the said rods positioned over said weir tank, cam means to lower said support means whereby said rods will be dipped into the said thixotropic mixture a predetermined depth and return said support means and said rods back to an elevated position.

4. Apparatus for dipping rods into a thixotropic mixture of glass frit comprising: a weir tank having a sloping bottom converging to a point for retaining said dipping mixture, an overflow tank surrounding said weir tank but spaced therefrom, an inlet for said thixotropic mixture in the lowermost portion of said weir tank at a convergence point, means to pump said thixotropic mixture to said inlet in said weir tank, outlet means at the bottom of said overflow return tank, recycle means connecting said outlets to said pump means to circulate said thixoropic mixture, rotatable support means positioned over said weir tank, means to clamp work pieces to said support means in an upright position, means to lower said support means holding said work pieces into said thixotropic mixture in said weir tank and to return said support means and said work pieces to an elevated position.

5. Method of dipping an elongated relatively slender article of work into a fluid dipping mixture, the steps which comprise: positioning said article of work over a weir tank filled with said dipping mixture, pumping said mixture in a recycle stage from a collector tank circumferentially spaced from the weir tank to the lowermost portion of said weir tank, whereby the said mixture flows directly upwardly through the weir tank and thence over the sides of said weir tank into said circumferentially spaced collector tank, deactivating said pump for a dipping stage, forming a relatively even surface of said mixture, lowering said article of work into said dipping mixture to a predetermined depth, thereafter raising said article of work to an elevated position over said weir tank.

6. Method of dipping an elongated relatively slender article of work into a fluid dipping mixture, the steps which comprise: positioning said article of work over a weir tank filled with said dipping mixture, pumping said mixture in a recycle stage from a collector tank circumferentially spaced from said weir tank through a centrally located supply reservoir directly upwardly through the lower portion of said weir tank, whereby the said mixture is agitated in the said weir tank and thence over the sides thereof into said collector tank, deactivating said pump for a dipping stage, leveling the top surface of said dipping mixture to conform with the top edge of said weir tank, lowering said article of work into said mixture to a predetermined depth, thereafter raising said article of work to an elevated position over said weir tank.

7. Method of dipping an elongated relatively slender article of work into a thixotropic mixture of suspension of solids, the steps which comprise: positioning said articles of work over a weir tank filled with said thixotropic suspension, pumping said mixture in a recycle stage from a collector tank circumferentially spaced from said weir tank to the lowermost portion of said weir tank, whereby the said mixture is passed directly upwardly and agitated through internal circulation in said weir tank and is caused to flow over the sides of said weir tank into said circumferentially spaced collector tank, deactivating said pump for a dipping stage, leveling the top surface of said dipping mixture to conform with the top edge of said weir tank, lowering said article of work into said thixotropic mixture to a predetermined depth, thereafter raising the said article of work to an elevated position over said weir tank.

8. Method of dipping elongated relatively thin ganged articles of work into a fluid dipping mixture, the steps which comprise: positioning said ganged articles of work over a weir tank filled with said dipping mixture, pumping said mixture in a recycle stage from a collector tank circumferentially spaced from said weir tank to the lowermost portion of said weir tank whereby the said mixture is passed directly upwardly and agitated in the said weir tank and is caused to flow over the sides of said weir tank into said circumferentially spaced collector tank, deactivating said pump for a dipping stage, leveling the top surface of said dipping mixture to conform with the top edge of said weir tank, lowering said ganged articles of work into said dipping mixture to a predetermined depth, thereafter raising said ganged articles of work to an elevated position over said weir tank.

9. Method of dipping an elongated relatively slender article of work into a thixotropic dipping mixture of solids, the steps which comprise: positioning said article of work over a weir tank filled with said dipping mixture, pumping said mixture in a recycle stage from a collector tank circumferentially spaced from said weir tank to the lowermost portion of said weir tank whereby the said mixture is passed directly upwardly and agitated in the said weir tank and is caused to flow over the sides of said weir tank into said collector tank, deactivating said pump for a dipping stage, lowering said article of work into said dipping mixture to a predetermined depth, thereafter raising said article of work to an elevated position over said weir tank.

References Cited in the file of this patent

UNITED STATES PATENTS

| 2,165,364 | Ferngren | July 11, 1939 |
| 2,814,268 | Korbitz | Nov. 26, 1957 |

FOREIGN PATENTS

| 563,279 | Canada | Sept. 16, 1958 |